US006296586B1

(12) United States Patent
Walkenhorst et al.

(10) Patent No.: US 6,296,586 B1
(45) Date of Patent: Oct. 2, 2001

(54) TENSIONING DEVICE FOR A CHAIN OR A BELT DRIVE FOR A MOTOR OF A HAND MACHINE TOOL

(75) Inventors: Marc Walkenhorst, Hamburg; Andreas Singer, Fraureuth, both of (DE)

(73) Assignee: Dolmar GmbH, Hamburg (DE)

( * ) Notice: Subject to any disclaimer, the term of this patent is extended or adjusted under 35 U.S.C. 154(b) by 0 days.

(21) Appl. No.: 09/416,517

(22) Filed: Oct. 8, 1999

(30) Foreign Application Priority Data

Oct. 9, 1998 (DE) ............................................ 198 46 555

(51) Int. Cl.[7] ................................ F16H 7/08; B27B 17/14

(52) U.S. Cl. .......................... 474/101; 474/117; 474/113; 30/386

(58) Field of Search ..................................... 474/101, 144, 474/145, 114, 113, 117, 115, 116; 30/381, 382, 383, 385, 386, 122, 390, 388

(56) References Cited

U.S. PATENT DOCUMENTS

| | | | | |
|---|---|---|---|---|
| 2,765,821 | * | 10/1956 | Strunk | 30/386 |
| 3,194,284 | * | 7/1965 | Walker | 30/386 |
| 3,382,898 | * | 5/1968 | Walker | 30/382 |
| 3,611,646 | | 10/1971 | Cameron . | |
| 3,866,320 | | 2/1975 | Progl . | |
| 5,177,871 | * | 1/1993 | Martenson | 474/117 X |
| 5,491,899 | * | 2/1996 | Schliemann et al. | 30/386 |
| 5,497,557 | * | 3/1996 | Martinsson | 30/386 |

FOREIGN PATENT DOCUMENTS

| | | |
|---|---|---|
| 3831110A1 | 3/1990 | (DE) . |
| 4222075A1 | 1/1994 | (DE) . |
| 3841644 C2 | 12/1997 | (DE) . |

* cited by examiner

*Primary Examiner*—David A. Bucci
*Assistant Examiner*—Marcus Charles
(74) *Attorney, Agent, or Firm*—McCormick, Paulding & Huber LLP

(57) ABSTRACT

A tensioning device for a chain or a belt drive for a motor of a hand machine tool, especially for a chain saw or a grinding or abrasive cutting-off machine, with a longitudinally movable bracket, such as a bracing or an arm, which can be fixed together with a cover with at least one bolt with a screwable nut to a casing or to another part of the hand machine tool, whereby the tensioning device has an adjusting screw extending in the longitudinal direction of the bracket on which a rider screw is movable to-and-fro by rotating the adjusting screw, the rider screw having a trunnion extending through an opening of the bracket so that, for tensioning the chain or the belt drive, the bracket follows a movement of the rider screw. Here a length of the trunnion is configured such that, the cover being set upon the hand machine tool, and the bracket being placed between the cover and the hand machine tool, the bolt projects sufficiently far through the cover for screwing on the nut only if the trunnion penetrates into the opening of the bracing.

7 Claims, 4 Drawing Sheets

TENSIONING DEVICE FOR A CHAIN OR A BELT DRIVE FOR A MOTOR OF A HAND MACHINE TOOL

BACKGROUND OF THE INVENTION

1. Technical Field

The invention refers to a tensioning device for a chain or a belt drive for a motor of a hand machine tool, especially for a chain saw or a grinding or abrasive cutting-off machine, with a longitudinally movable bracket, such as a bracing or an arm, which can be fixed together with a cover with at least one bolt with a screwable nut to a casing or to another part of the hand machine tool, whereby the tensioning device shows an adjusting screw extending in the bracket longitudinal direction on which a rider screw is movable to-and-fro by rotating the adjusting screw, the rider screw having a trunnion extending through an opening of the bracket so that, for tensioning the chain or the belt drive, the bracket follows a movement of the rider screw.

2. Prior Art

A tensioning device according to the type is known from DE-OS-25 09 194. However, there results here the disadvantage that an operating person does not exactly know, when mounting the cover, if the tensioning device is in its predetermined position for which the trunnion projects through the opening of the bracket or if the trunnion strikes on the bracket. In the latter case a drawing up of the nut on the bolt leads to an undesired damaging of the cover or of the bracket.

SUMMARY OF THE INVENTION

The aim of this invention is to make avsilable an improved tensioning device of the above mentioned type which eliminates the above mentioned disadvantages.

This aim is achieved by a tensioning device of the above mentioned type.

To this end, the invention provides for that a length of the trunnion is configured so that, the cover being set upon and the bracket being placed between the cover and the hand machine tool, the bolt for screwing on the nut projects sufficiently far through the cover only if the trunnion penetrates into the opening of the bracing.

This has the advantage that, when assembling the hand machine tool and especially when drawing up the nut on the trunnion, a damaging of the cover or of the bracket is efficiently avoided by the trunnion which is in the opening of the bracket, since the trunnion projects sufficiently far though the cover, the trunnion striking on the bracket, in order to be able to screw a nut thereon. Thus an operating person immediately recognizes, because of the bolt which is not accessible, that a adjusting of the tensioning device has not been correctly selected and can immediately correct it.

In a preferred embodiment, the bolt shot is a predetermined length $L_B$, the trunnion a predetermined length $L_Z$, the cover in the area of the passage of the bolt a predetermined thickness $D_D$ or a recess with a predetermined depth $T_D$ and the bracket a predetermined thickness $D_A$, whereby the length $L_Z$ of the trunnion is selected such that the relationship $L_Z \geqq L_B-(D_D+D_A)$ or the relationship $L_Z \geqq T_D-(D_D+D_A)$ is fulfilled. Here it should be noted that the bolt, as generally usual, does not project beyond the chain cover, i.e. $L_Z \leqq D_A+D_D+T_D$.

In order to avoid damages of the hand machine tool casing, the trunnion penetrates into a groove configured on the hand tool machine, whereby the groove shows a predetermined depth $T_N$ so that the relationship $T_N > L_Z - D_A$ is fulfilled.

The adjusting screw is appropriately connected over a spiral gearing or a worm gear with a drive screw, whereby for a simple and quick tensioning of the chain or of the belt drive the drive screw is actuatable from outside the cover by means of a tool and/or is connected resistant to torsion with an adjusting wheel which is manually operatable from outside the cover.

BRIEF DESCRIPTION OF THE DRAWINGS

The invention will be described hereunder with reference to the annexed drawings.

DESCRIPTION OF THE PREFERRED EMBODIMENTS

Figure 1:
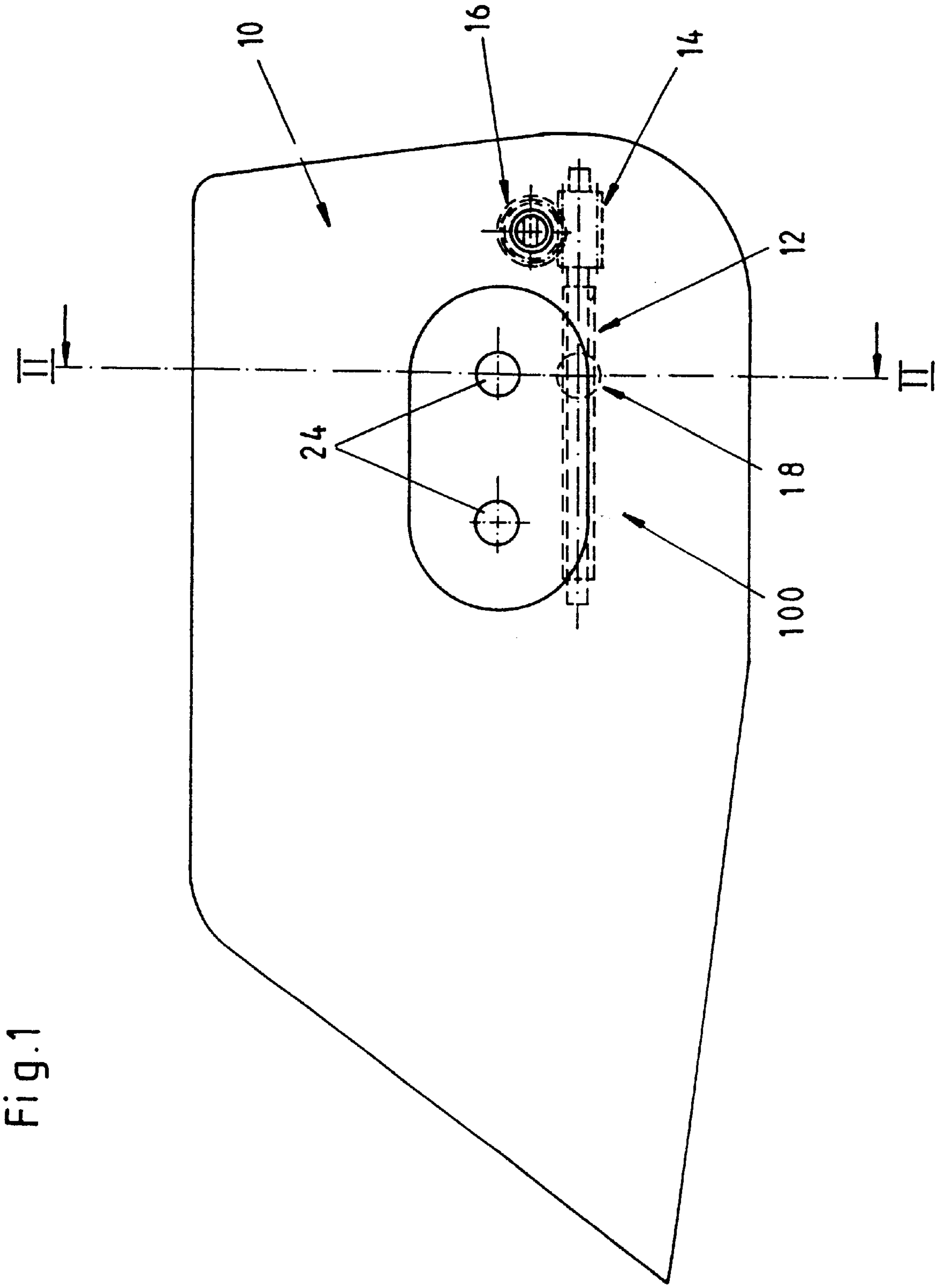
FIG. 1 is a side view of a first preferred embodiment of a tensioning device according to the invention.
Figure 2:
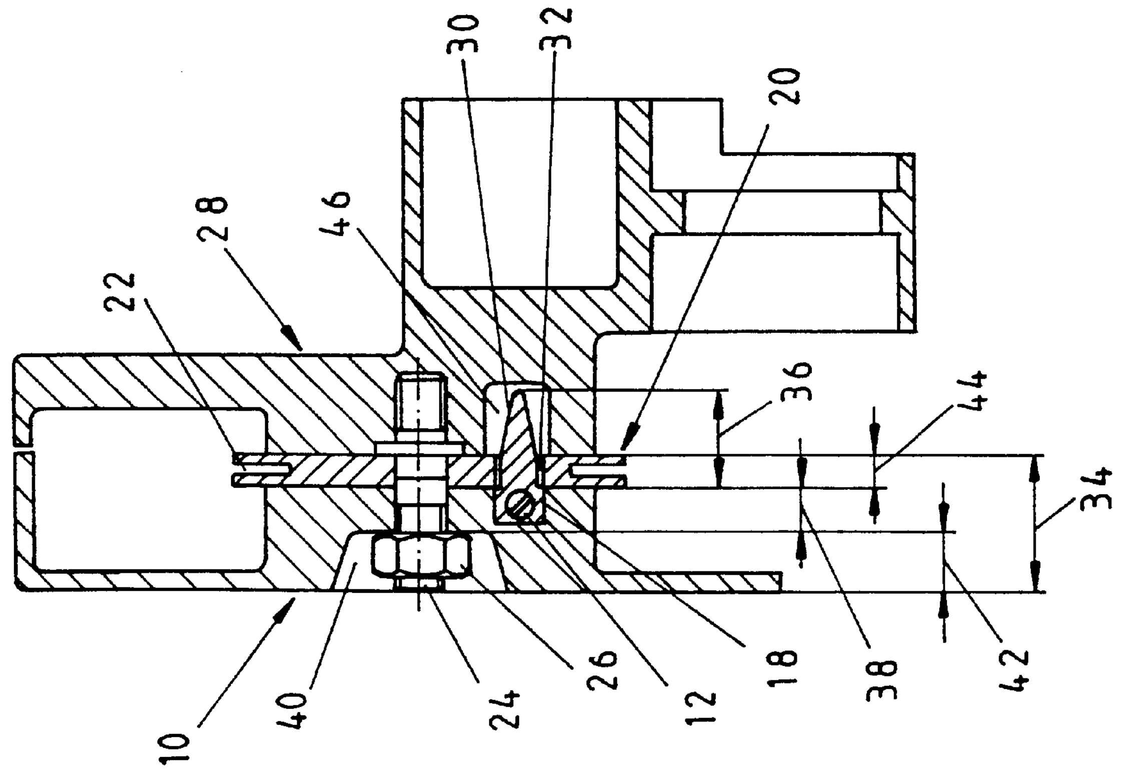
FIG. 2 is a sectional view along line II—II of FIG. 1.
Figure 3:
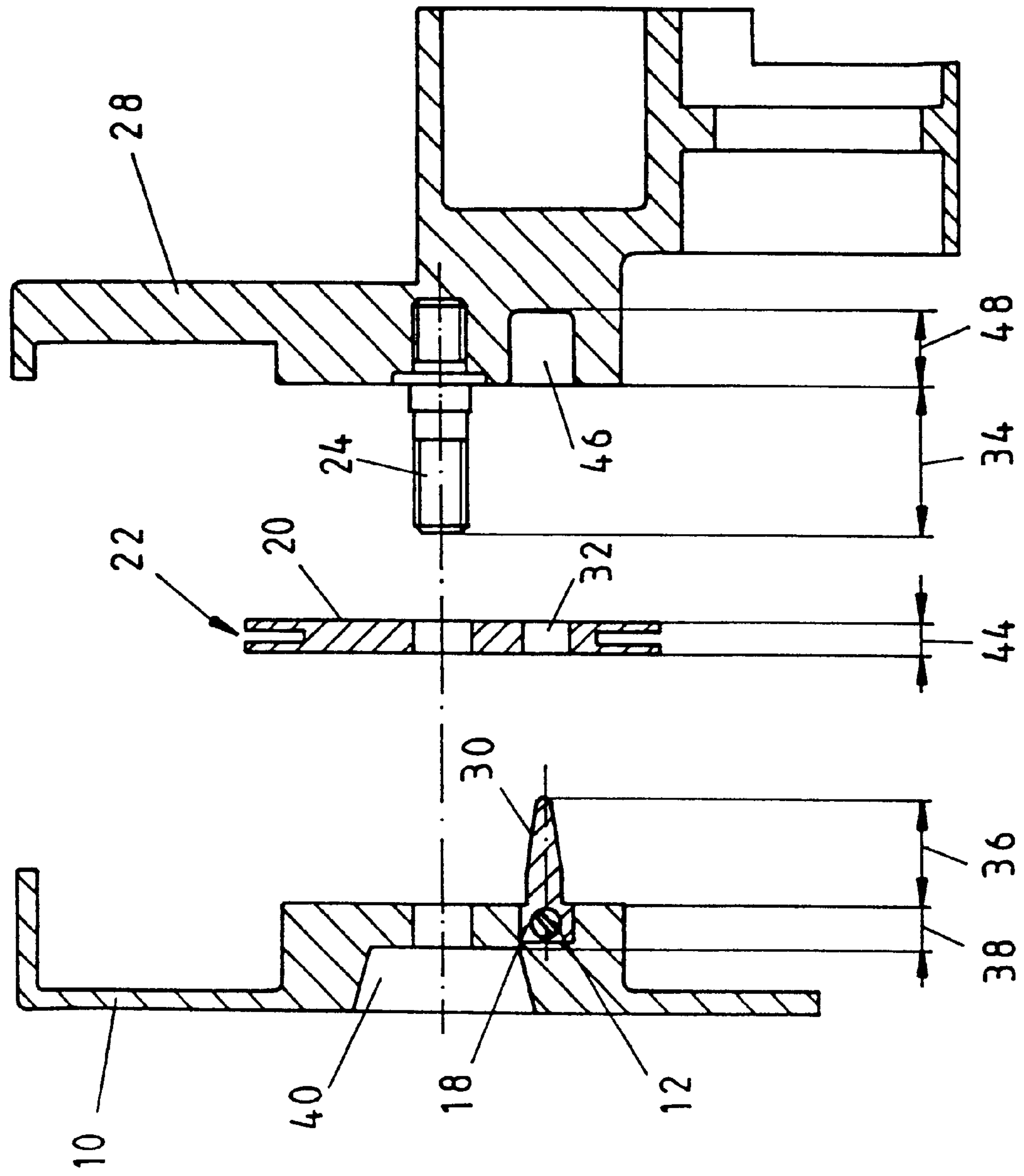
FIG. 3 is a sectional view according to FIG. 2, the individual parts being dismantled.

The invention will be explained below on the base of a chain saw, whereby this is to be understood as an example and the invention should not in any case be limited to chain saws. As represented in FIGS. 1 to 3, a first preferred embodiment of a tensioning device 100 according the invention for a chain saw with a chain cover 10 comprises an adjusting screw 12 in the form of a screw rod and a drive screw 16 in form of a worm wheel 16 actively engaged with a worm 14 of the screw rod 12. This worm wheel 16 comprises means for the engagement of a tool, like for example a slit, the worm wheel 16 being rotatably drivable by means of a tool. A rider screw 18 is placed on the screw rod, rider screw which engages with an internal screw thread into a corresponding external screw thread of the screw rod 12 so that a rotation of the screw rod 12 causes a motion of the rider screw 18 along the screw rod 12. The chain cover 10 and a bracket or a bracing 20, on which a not represented endless drive member, such as a chain or belt, circulates in a groove 22, can be fixed together by means of bolts 24 and of nuts 26 which can be screwed thereon to a motor casing 28 of the chain saw.

In a predetermined arrangement of the tensioning device 100, a trunnion 30 connected with the rider screw 18 projects through an opening 32 of the bracket 20 so that the rider screw 18 moving on the screw rod 12 moves directly the bracket 20 correspondingly in its longitudinal direction. By rotating the worm wheel 16, a desired chain tension can thus be adjusted.

As may be seen particularly in FIGS. 2 and 3, the bolt 24 shows a predetermined length $L_B$ 34, the trunnion 30 a predetermined length $L_Z$ 36, the cover 10 in the area of the passage of the bolt 24 a predetermined thickness $D_D$ 38 or a recess 40 with a predetermined depth $T_D$ 42 and the bracket 20 a predetermined thickness $D_A$ 44. A groove 46 with a predetermined depth $T_N$ 48 is provided for in the motor casing 28.

According to the invention, the length $L_Z$ 36 of the trunnion 30 is selected such that the relationship $L_Z \geqq L_B-(D_D+D_A)$ (marginal condition $L_Z \leqq D_A+D_D+T_D$) or the relationship $L_Z \geqq T_D-(D_D+D_A)$ is fulfilled. In other words, the bolts 24 penetrate sufficiently over the chain cover 10 into the recess 40 for screwing on the nuts 26 only when the trunnion 30 engages into the opening 32 and the groove 46. Otherwise, the trunnion 30 strikes on the bracket 20 and avoids through its length $L_Z$ 36 that the bolts 24 can sufficiently extend through the chain cover 10. Because of the chain cover 10, the bolts 24 are then not accessible to the user for screwing on the nuts 26 and the user recognizes immediately, when assembling, that the tensioning device 100 according to the invention is not correctly adjusted. Thus an unintentional tightening of the nuts 26 onto the bolt 24 is efficiently avoided if the trunnion 30 is not correctly engaged into the opening 32 so that there result undesired damages of the chain cover 10 or of the bracket 20.

Figure 4:
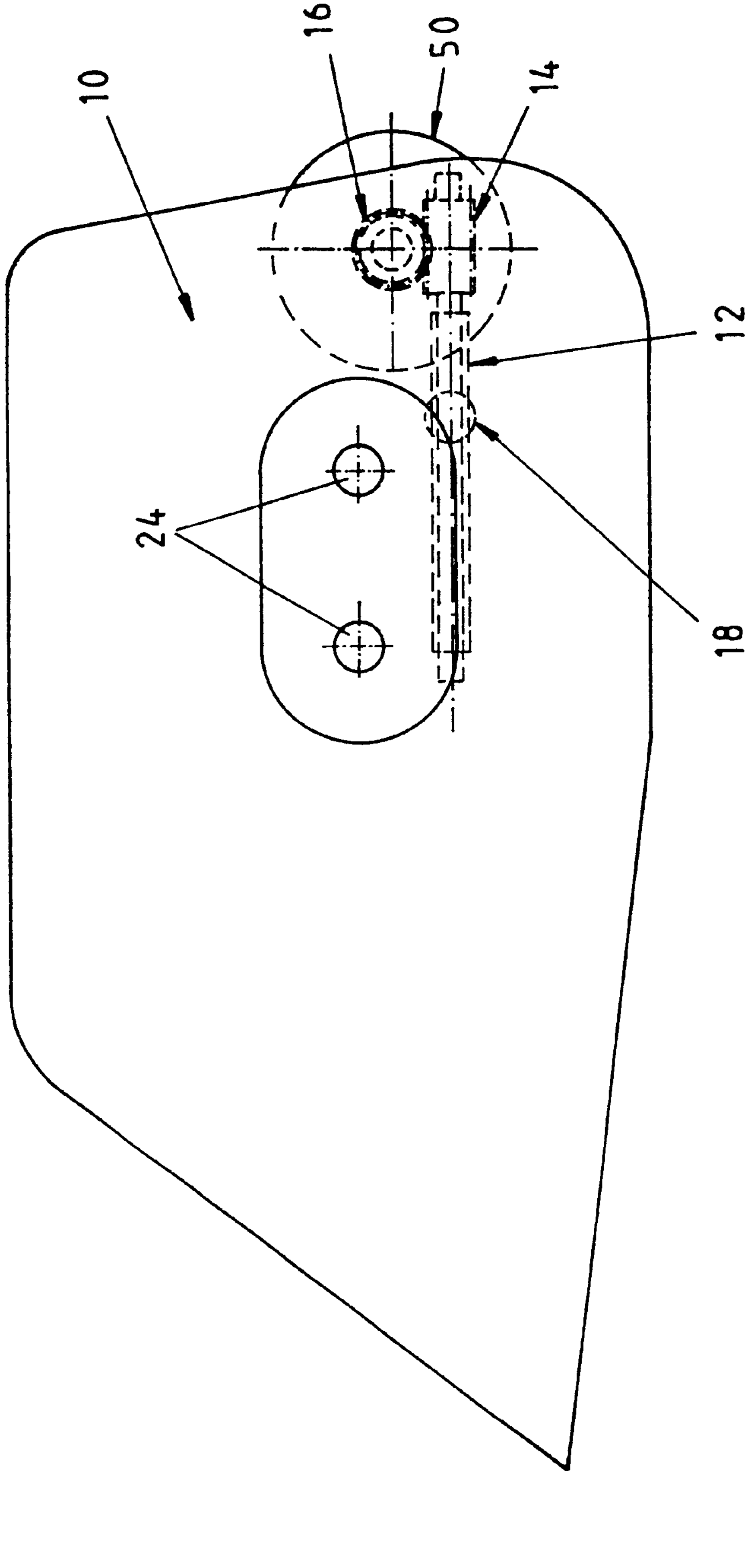
FIG. 4 is a side view of a second preferred embodiment of a tensioning device according to the invention.

FIG. 4 shows an alternative embodiment of a tensioning device 200 according to the invention, whereby the same same parts are designated with the same reference numerals so that we refer, for their explanation, to the description above with respect to the FIGS. 1 to 3. A difference with the first embodiment 100 consists in the fact that the drive screw or the worm wheel 12 is additionally provided with an adjusting wheel 50, which is accessible from outside the chain cover 10, which makes the use of a special tool to actuate the worm wheel 16 unnecessary.

LIST OF REFERENCE NUMERALS

100, 200 Tensioning device
10 Chain cover
12 Adjusting screw/screw rod
14 Worm
16 Drive screw/worm wheel
18 Rider screw
20 Bracket/bracing
22 Groove
24 Bolt
26 Nut
28 Motor casing
30 Trunnion
32 Opening
34 Length $L_B$ of the bolt
36 Length $L_Z$ of the trunnion
38 Thickness $D_D$ of the cover
40 Recess
42 Depth $T_D$ of the recess
44 Thickness $D_A$ of the bracket
46 Groove
48 Depth $T_N$ of the groove
50 Adjusting wheel

What is claimed is:

1. A tensioning device for an endless drive member for a motor of a hand machine tool, said device comprising:

a fixed part of a machine hand tool having at least one protruding bolt, a cover having at least one hole extending through the cover to receive the at least one protruding bolt of the fixed part, a longitudinally movable endless member tensioning bracket with at least one hole extending therethrough to receive the at least one protruding bolt of the fixed part and which can be fitted onto the at least one bolt together with the cover and fixed to the fixed part by a nut screwable onto the bolt, an adjusting screw extending in the longitudinal direction, and a rider screw carried by the adjusting screw and movable to and fro in the longitudinal direction by rotating the adjusting screw, the rider screw having a trunnion extendable though a mating opening of the bracket so that, for endless member tensioning purposes, the bracket follows the longitudinal movement of the rider screw, the trunnion having a length so selected that, in assembling the cover and bracket with the protruding bolt and with the fixed part of the machine, with the bracket being first placed on the bolt and the cover being next placed on the bolt, the bolt projects sufficiently far through the cover to permit screwing of the nut onto the bolt only if the trunnion penetrates into the mating opening of the bracket.

2. A tensioning device according to claim 1, wherein, the bolt has a predetermined length $L_B$, the trunnion has a predetermined length $L_Z$, the cover in the area of the passage of the bolt has a predetermined thickness $D_D$ and the bracket has a predetermined thickness $D_A$, the length $L_Z$of the trunnion being such that the relationship $$L_Z \geqq L_B-(D_D+D_A)$$

is fulfilled.

3. A tensioning device according to claim 1, wherein the trunnion has a predetermined length $L_Z$, the bracket has a predetermined thickness $D_A$ and the cover in the area of the passage of the bolt has a recess with a predetermined thickness $T_D$ as well as a predetermined thickness $D_D$, the length $L_X$ of the trunnion being such that the relationship $$L_Z \geqq T_D-(D_D+D_A)$$

for the marginal condition $$L_Z \leqq D_A+D_D+T_D$$

is fulfilled.

4. A tensioning device according to claim 1, wherein the adjusting screw is connected with a drive screw over a spiral gearing or a worm gear.

5. A tensioning device aceding to claim 3, wherein the trunnion penetrates into a groove configured in the fixed part of the hand machine tool, the groove having a predetermined depth $T_N$ such that the relationship $$T_N > L_Z-D_A$$

is fulfilled.

6. A tensioning device according to claim 4, wherein the drive screw can be actuated from outside the cover by means of a tool.

7. A tensioning device according to claim 4, wherein the drive screw is connected with an adjusting wheel which is manually actuatable from outside the cover.

* * * * *